United States Patent [19]

Edamura et al.

[11] 4,042,646
[45] Aug. 16, 1977

[54] PROCESS FOR CURING UNSATURATED RESINS

[75] Inventors: Koji Edamura; Yoshimasa Nakagawa; Yoshitaka Ikeda, all of Aichi, Japan

[73] Assignee: Nihon Yushi Co., Ltd., Tokyo, Japan

[21] Appl. No.: 608,041

[22] Filed: Aug. 27, 1975

[30] Foreign Application Priority Data

Sept. 2, 1974 Japan .................................. 49-99969

[51] Int. Cl.$^2$ ............................................. C08L 67/06
[52] U.S. Cl. .................................. 260/864; 260/75 T; 526/11.1
[58] Field of Search ............... 260/864, 75 T, 22 CA, 260/23 P; 526/11.1

[56] References Cited

U.S. PATENT DOCUMENTS

| | | | |
|---|---|---|---|
| 3,511,792 | 5/1970 | Helm et al. | 260/23 P X |
| 3,630,960 | 12/1971 | Chetakian | 260/864 X |
| 3,642,673 | 2/1972 | Muhleisen | 260/23 P X |
| 3,644,612 | 2/1972 | Meyer et al. | 260/22 CA |
| 3,787,527 | 1/1974 | Meyer et al. | 260/863 X |

*Primary Examiner*—Lucille M. Phynes
*Attorney, Agent, or Firm*—Blanchard, Flynn, Thiel, Boutell & Tanis

[57] ABSTRACT

A process for curing unsaturated polyester resins in a very short time at a low temperature using $\beta$-amino-$\alpha$,$\beta$-unsaturated ketone and peroxide containing hydroperoxy group without the presence of metallic salt. The product thus obtained is not colored.

12 Claims, No Drawings

PROCESS FOR CURING UNSATURATED RESINS

BACKGROUND OF THE INVENTION

1. Field of the Invention

This invention relates to a process for curing unsaturated polyester resins.

2. Description of the Prior Art

Unsaturated polyester resins are widely used in the field of composite materials such as, for example, castings, paintings and fiber glass products.

As the use of unsaturated polyester resins has thus expanded and unsaturated polyester resins are massproduced, the producing process, curing method, curing conditions, characteristics and cost of curing moldings of unsaturated polyester resins are studied with the result that the cycle-up of molding, simplification of working process, reduction of curing cost and fast curing of the curing agent thereof are achieved.

In order to promote the hardening of an unsaturated polyester resin when the unsaturated polyester resin is cured by using an organic peroxide, it is most common to employ a curing accelerator for promoting the radical decomposition of the organic peroxide, and the representative one is a process which uses a Redox catalyst.

One exemplification of the process is that using the combination of a ketone peroxide and a metallic soap, particularly cobalt salt which are generally used in the hardening of unsaturated polyester resins at room temperature.

However, this process has such disadvantages that the curing time of the unsaturated polyester resin is long, the cured material is colored pink by the cobalt salt, and it is difficult to completely harden the unsaturated polyester resin in a cold area.

In order to overcome these disadvantages of the conventional process, various processes have been proposed for promoting the curing of unsaturated polyester resins by adding a third material to the Ketone peroxide and cobalt salt as an auxiliary curing agent. Of these proposed processes, there are processes which use a β-diketone of Keto-enol tautomer (See U.S. Pat. No. 3584076) and cyclopentane derivatives of β-dicarbonyl compounds (See British Pat. No. 1,293,209) as the third material.

However, these processes have an indispensable requirement, namely, that a metallic salt such as a cobalt salt, must be used, and therefore, not only is there imparted to the product the peculiar color of the metallic salt, but also a chelate compound of the third material and the metallic salt is formed with the result being that the chelate compound imparts its peculiar color such as, for example, green, to the product to cause it to have an uneven color. In addition, since a gloomy feeling is imparted to a decorative plate when these processes for curing unsaturated polyester resin are employed to produce the decorative plate, they are not practical.

In addition, as the process for curing unsaturated polyester resins using the third material has complicated the working steps and has increased the curing cost, it is not practical except when high speed curing is particularly required.

There is also disclosed a process for curing unsaturated polyester resins using an organic peroxide and a tertiary amine. However, the diacyl peroxide, an organic peroxide commonly used in this process, is extremely sensitive to friction and shock and is also easily exploded and therefore is very dangerous to use. Accordingly, this process has disadvantages in that it involves complicated steps for the treatment of the dangerous compound, for instance, a step which changes the dangerous compound into a paste-like form using a diluent, in that the inhibition action due to air is great when the resin is cured, in that the product is strongly colored orange-yellow and, in addition, tends to discolor due to light, heat, etc.

SUMMARY OF THE INVENTION

It is an object of the present invention to provide a novel process for curing unsaturated polyester resins which has superior curing characteristics such as short curing time and also has simple working steps.

It is another object of the present invention to provide a process for curing unsaturated polyester resins which may cure completely unsaturated polyester resins in a short time even in a cold atmosphere.

It is a further object of the present invention to provide a process for curing unsaturated polyester resins which uses a stable catalyst and there is no danger of explosion in the storage and curing step.

It is still another object of the present invention to provide a process for curing unsaturated polyester resins which may completely cure unsaturated polyester resins using hydrogen peroxide.

The present invention has been completed on the basis of the following discovery and technology resulting from the various studies on the acceleration of the curing of unsaturated polyester resins:

a. It is common knowledge that when the curing of unsaturated polyester resins is accelerated by using a peroxide containing a hydroperoxy group (—OOH) such as ketone peroxide, hydroperoxide, etc. generally available on the market, keto-enol tautomer such as β-diketone, etc. and amine compounds heretofore used create only a weak curing acceleration action at room temperature and are not good for practical use unless a third material such as a metallic salt, particularly cobalt salt is present. But to our astonishment, we discovered that even if the third material is not used, the aforementioned peroxide and β-amino-α,β-unsaturated ketone which will be hereinafter described may cure unsaturated polyester resins in a very short time at low temperature.

b. It is also common knowledge that hydrogen peroxide among the aforementioned peroxides has only a weak capacity of curing unsaturated polyester resins even if good accelerator is used and it has a low calorific power in that curing and accordingly it is difficult to completely cure unsaturated polyester resins and therefore is not good for practical use. However, if β-amino-α,β-unsaturated ketone is used therewith, hydrogen peroxide may cure unsturated polyester resins in a short time with sufficient calorific power.

c. β-amino-α,β-unsaturated ketones can accelerate the curing of unsaturated polyester resins in combination with almost all the peroxides, at elevated temperature.

According to one aspect of the present invention, there is provided a process for curing unsaturated polyester resins which employs a β-amino-α,β-unsaturated ketone in the step of curing unsaturated polyester resins using a peroxide containing a hydroperoxy group (—OOH):

where in the β-amino-α,β-unsaturated ketone has the structure represented by the following formula (I) having the following tautomerism with the following compounds represented by the formulae (II) and (III):

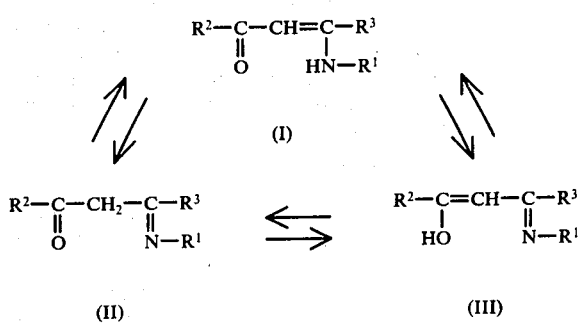

wherein $R^1$ is hydrogen, alkyl having one to 6 carbon atoms either normal chain or branched chain, a substituted alkyl having one to 6 carbon atoms either normal chain or branched chain, cycloalkyl having 3 to 12 carbon atoms or aralkyl, $R^2$ is hydrogen alkyl having one to 6 carbon atoms either normal chain or branched chain, cycloalkyl having 3 to 12 carbon atoms, aryl, aralkyl, alkoxy, or amino, and $R^3$ is the same as $R^2$.

The representative examples of such compounds referring to $R^1$, $R^2$ and $R^3$ thereof are shown in the following Table 0:

primary amine. (See N. H. Cromwell; Chemical Review: Vol:38, 83–137 page, (1946))

Unsaturated polyester resins can be obtained as liquid resins by esterifying an unsaturated polybasic acid such as, for example, maleic anhydride or fumaric acid and a saturated polybasic acid represented by phthalic anhydride, adipic acid and sebacic acid, with a polyalcohol such as propyleneglycol, ethyleneglycol, etc., and dissolving the unsaturated alkyd thus obtained in a polymerizable monomer such as styrene monomer.

Peroxides containing the hydroperoxy group heretofore described include, for example, hydrogen peroxide, lower aliphatic ketone peroxides such as methylethylketone peroxide and methylisobutylketone peroxide; cycloaliphatic ketone peroxides such as cyclohexanone peroxide, methylcyclohexanone peroxide and 3,3,5-trimethylcyclohexanone peroxide; ketone peroxides derived by diketone peroxides such as acetylacetone peroxide, diacetone alcohol and 4-methoxy-4-methylpentane-2-one with hydrogen peroxide, that is, methylethylketone peroxide, methylisobutylketone peroxide, cyclohexanone peroxide, acetylacetone peroxide which are obtainable on the market; hydroperoxide such as cumene hydroperoxide, tert-butyl hydroperoxide, 2,5-dimethylhexyl-2,5-dihydroperoxide, -p-menthane hydroperoxide, aldehyde peroxide derived by lower aliphatic aldehyde or aromatic aldehyde with hydrogen peroxide.

The amount used of the peroxide containing hydroperoxy group is 0.01 to 10 wt% preferably 0.5 to 5 wt%, based on the unsaturated polyester resin.

TABLE 0

| $R^1$ | $R^2$ | $R^3$ | β-amino-α,β-unsaturated ketone |
|---|---|---|---|
| H | $CH_3$ | $CH_3$ | 4-amino-3-pentene-2-one |
| $CH_3$ | $CH_3$ | $CH_3$ | 4-methylamino-3-pentene-2-one |
| $CH_3CH_2$ | $CH_3$ | $CH_3$ | 4-ethylamino-3-pentene-2-one |
| $CH_3CH_2CH_2$ | $CH_3$ | $CH_3$ | 4-n-propylamino-3-pentene-2-one |
| $(CH_3)_2CH$ | $CH_3$ | $CH_3$ | 4-i-propylamino-3-pentene-2-one |
| $CH_3CH_2CH_2CH_2$ | $CH_3$ | $CH_3$ | 4-n-butylamino-3-pentene-2-one |
| $CH_3CH_2CH(CH_3)$ | $CH_3$ | $CH_3$ | 4-sec-butylamino-3-pentene-2-one |
| $(CH_3)_3C$ | $CH_3$ | $CH_3$ | 4-t-butylamino-3-pentene-2-one |
| ⟨H⟩- (cyclohexyl) | $CH_3$ | $CH_3$ | 4-cyclohexylamino-3-pentene-2-one |
| $HOCH_2CH_2$ | $CH_3$ | $CH_3$ | 4-ethanolamino-3-pentane-2-one |
| ⟨O⟩-$CH_2$ (benzyl) | $CH_3$ | $CH_3$ | 4-benzylamino-3-pentene-2-one |
| $NCCH_2CH_2$ | $CH_3$ | $CH_3$ | 4-(2'-cyanoethyl)-amino-3-pentene-2-one |
| H | $CH_3CH_2CH_2$ | $CH_3$ | 2-amino-2-heptene-4-one |
| $CH_3$ | $CH_3CH_2$ | $CH_3CH_2$ | 4-methylamino-3-heptene-2-one |
| H | ⟨O⟩ (phenyl) | $CH_3$ | 1-phenyl-3-amino-2-butene-1-one |
| $CH_3$ | ⟨O⟩ (phenyl) | $CH_3$ | 1-phenyl-3-methylamino-2-butene-1-one |
| H | ⟨O⟩ | ⟨O⟩ | 1,3-diphenyl-3-amino-2-propene-1-one |
| H | $OCH_3$ | $CH_3$ | methyl-β-aminocrotonate |
| H | $OCH_2CH_3$ | $CH_3$ | ethyl-β-aminocrotonate |
| $CH_3$ | $OCH_3$ | $CH_3$ | methyl-β-methylaminocrotonate |
| H | $NH_2$ | $NH_2$ | malonic acid amide amidine |
| H | $CH_3CH_2O$ | $OCH_2CH_3$ | malonic acid ethylester iminoethyleter |

All these compounds have the structures of an β-amino-α,β-unsaturated ketone which undergoes ketimine-enamine and keto-enol tautomerism. The synthesizing process of these β-amino-α,β-unsaturated ketones has been known for many years, and they are generally synthesized easily by reacting the corresponding β-diketone or β-ketoester with ammonia or a primary amine. As another process, they can also be obtained by reacting β-acetylenic ketone with ammonia or The amount used of β-amino-α,β-unsaturated ketone is 0.005 to 10 wt%. preferably 0.01 to 5 wt% based on the unsaturated polyester resin.

The curing step is conducted at −10° to +150° C., but in practice it is preferably conducted at 0° to 40° C.

In carrying out the present invention, the sequence of adding the peroxide and β-amino-α,β-unsaturated ketone to the unsaturated polyester resin is not critical.

It is convenient for the operation to add the peroxide to the admixture of the β-amino-α,β-unsaturated ketone and resin just before its curing.

When there is used a β-amino-α,β-unsaturated ketone which is solid at room temperature, it is better for smooth operation to dissolve it into a suitable solvent and use the thus obtained solution such as styrene monomer for curing.

According to present invention, to the unsaturated polyester resin, according to the object thereof, there can be added a filler such as calcium carbonate, titanium oxide, clay, talc and the like, antimony compound such as antimony oxide, a flame retarder such as tri- or dibromopropyl phosphate, chlorinated paraffin, other stabilizers, a coloring agent, composite such as glass fiber, curing accelerator such as metallic salt, tartiary amine, acetylacetone and the like, to thereby cure the resin.

PREFERRED EMBODIMENTS OF THE INVENTION

The following Examples are shown by way of illustration only and the present invention is not limited only by the following Examples:

EXAMPLES 1 to 10

2 mol. of maleic anhydride and 2 mol. of phthalic anhydride are esterified by 4.1 mol. of propyleneglycol so as to obtain an unsaturated alkyd, and 30 parts by weight of styrene and 0.01 part of weight of hydroquinone are added to 70 parts by weight of the thus-obtained unsaturated alkyd to produce a general purpose unsaturated polyester resin, which will be hereinafter called resin A. Then, using the resin A, β-amino-α,β-unsaturated ketone shown in Table 1 is added by the amount of $2 \times 10^{-3}$ mol. to the resin A, and then using the peroxides shown in the Table 1, the respective β-amino-α,β-unsaturated ketone and peroxide are added to 50g. of the resin in accordance with JIS Standards K-6901 process so as to cure at room temperature of 25° C.

The gelation time, which will be hereinafter called GT, and minimum curing time, which will be hereinafter called CT., and maximum exothermic temperature at the time when the minimum curing time is reached, which will be hereinafter called PET, are measured, and the results thus obtained are listed in the Table 1.

In the column headed "Peroxide" in the Table 1, Item (1) is 90% hydrogen peroxide solution (for industrial use, made by Mitsubishi Gas-Chemical Co., Ltd.), Item (2) is 60% hydrogen peroxide solution (for industrial use, made by Mitsubishi Gas-Chemical Co., Ltd.), Item (3) is methylethylketone peroxide (55%) diluted with dimethyl phthalate (made by Nippon Oils and Fats Co., Ltd. as trade name of Permech N), and Item (4) is cyclohexanone peroxide (55%) diluted with hydrocarbon diluted (made by Nippon Oils and Fats Co., Ltd. as trade name of Perhexa H), Item (5) is cumene hydroperoxide (70%) diluted with aromatic hydrocarbon (made by Nippon Oils and Fats Co., Ltd. as trade name of Percumyl H).

The amount added of the peroxide is one having the same active oxygen as when 0.5g. of benzoyl peroxide (active oxygen 6.5%) is added (corresponding to BP 0.1%).

JIS Standards K-6901 process: 50±1 g. of specimen is weighed by a roberval balance and placed into a 50 ml. beaker and a predetermined amount of accelerator is added thereto, and the mixture is stirred uniformly by a glass bar, and then the specimen is so fixed in the thermostatic tank at 25°±0.5° C. that the surface of the specimen is disposed at about 1 cm from the solution surface therein.

When the temperature of the specimen becomes 25°±0.5° C., a predetermined amount of curing agent is added thereto and is sufficiently stirred, and then the specimen is poured in a test tube 18mm in diameter present in a thermostatic tank at 25°± 0.5° C up to the depth of 100 mm of the test tube. The gelation time by min., that is, the period from the time when the reagents are mixed with the specimen to the time when temperature of the specimen becomes 30° C. is measured, and the minimum curing time by min., that is, the period required for reaching the maximum temperature is measured, and the maximum exothermic temperature by °C., that is, the maximum temperature is measured.

These measurements are conducted more than twice, and the test results are obtained as the mean value of the measurements, and the types of the curing agent and accelerater are listed.

REFERENCE EXAMPLES 1 to 10

Using peroxides and β-amino-α,β-unsaturated ketone as listed in Table 2, the resin A is cured at 25° C. according to the same procedure as that described in the Examples 1 to 10, and the respective GT, CT and PET are obtained, and the results are listed in the Table 2.

In the Table 2, in the "Remarks" column X means that gelation does not occur in the curing procedure and Δ means that curing is not completed even when gelation does occur.

In the "Peroxide" column in the Table 2, Item (6) is dicumyl peroxide of 99% purity (made by Nippon Oils and Fats Co., Ltd. as trade name of Perkmil D), Item (7) is benzoyl peroxide of 99% purity (made by Nippon Oils and Fats Co., Ltd. as trade name of Niber B), Item (8) is tert-butylperoxy-2-ethylhexanoate of 99% purity (Nippon Oils and Fats Co., Ltd. as trade name of Perbutyl O), Item (9) is tert-butyl peroxybenzoate in of 99% purity (Nippon Oils and Fats Co., Ltd. as trade name of Perbutyl Z), and Item (10) is tert-butylperoxyisopropyl carbonate in 99% purity (made by Nippon Oils and Fats Co., as trade name of Perbutyl I).

These item numbers represent the corresponding peroxides in the following description, respectively.

As clear from the Tables 1 and 2, when an unsaturated polyester resin is cured with β-amino-α,β-unsaturated ketone and peroxide containing hydroperoxy group (—OOH), the unsaturated polyester resin can be cured in a very short time even if there are not used accelerators such as metallic salts heretofore generally used. On the other hand, even if β-amino-α,β-unsaturated ketone is used as the accelerator, if the peroxide does not have hydroperoxy group, the curing time becomes very long, and complete curing can hardly be obtained.

In view of the above results, it will be appreciated that the process of the present invention may simplify the curing step significantly.

TABLE 1

| Example | Peroxide | -amino- . -unsaturated ketone | GT (min) | CT (min) | PET (° C.) |
|---|---|---|---|---|---|
| 1 | (1) 90% hydrogen peroxide solution | 4-amino-3-pentane-2-one (A) | 10.5 | 16.2 | 157 |
| 2 | " | 4-methylamino-3-pentane-2-one (B) | 6.0 | 11.3 | 150 |
| 3 | (2) 60% hydrogen peroxide solution | (A) | 10.5 | 16.2 | 155 |
| 4 | " | (B) | 8.3 | 14.8 | 150 |
| 5 | (3) methyethylketone peroxide diluted | (A) | 12.9 | 22.0 | 141 |
| 6 | " | (B) | 5.5 | 13.0 | 143 |
| 7 | (4) cyclohexanone peroxide diluted | (A) | 16.0 | 27.0 | 134 |
| 8 | " | (B) | 5.6 | 13.0 | 140 |
| 9 | (5) cumenehydro peroxide diluted | (A) | 93.0 | 138.0 | 102 |
| 10 | " | (B) | 35.7 | 55.0 | 132 |

TABLE 2

| Reference Examples | Peroxide | -amino- . -unsaturated ketone | GT (min) | CT (min) | PET (° C.) | Remarks |
|---|---|---|---|---|---|---|
| 1 | (6) dicumyl peroxide | (A) | >500 | — | — | X |
| 2 | " | (B) | >500 | — | — | X |
| 3 | (7) benzoyl peroxide | (A) | >900 | — | — | X |
| 4 | " | (B) | >900 | — | — | X |
| 5 | (8) t-butylperoxy-2-ethylhexanoate | (A) | >900 | — | — | X |
| 6 | " | (B) | >900 | — | — | X |
| 7 | (9) t-butylperoxy benzoate | (A) | >900 | — | — | X |
| 8 | " | (B) | >900 | — | — | X |
| 9 | (10) t-butylperoxy isopropylcarbonate | (A) | 380 | — | — | Δ |
| 10 | " | (B) | >400 | — | — | X |

EXAMPLES 11 – 17

Using 90 wt% hydrogen peroxide solution (Item (1)) as peroxide, 50 grams of resin A was cured at 25° C with the respective adding amount of 4-amino-3-pentene-2-one as shown in Table 3, according to the same procedure as that described in Examples 1 – 10. Then, the relations between the amount added of β-amino-α,β-unsaturated ketone and curing characteristics thereof were obtained and the results are listed in Table 3.

As apparent from Table 3, the present invention is very effective for curing the resin by addition of a small amount of β-amino-α,β-unsaturated ketone.

That is to say, comparing the present invention to Reference Example 19, of a conventional curing method in which amount added of methylethylketone peroxide and cobalt salt is 1 wt%, based on the resin, respectively, it will be appreciated that according to the present invention, using 90 wt % hydrogen peroxide solution, the amount added of 4-amino-3-pentene-2-one is less than 0.1 wt % based on the resin, and is sufficient for obtaining same curing characteristics as that obtained by Reference Example 19.

Accordingly, neither odor nor coloration of moldings obtained by the invention were recognized.

EXAMPLES 18 – 31

According to the same procedure as that described in Examples 1 – 10, 60 wt% hydrogen peroxide solution and the respective β-amino-α,β-unsaturated ketones as described in Table 4 were added to 50 grams of resin A, which was cured at room temperature of 25° C and the thus obtained results are listed in Table 4.

EXAMPLES 32 – 45

According to the same procedure as that described in Examples 1 – 10, methyethylketone peroxide (Item (3)) as peroxide was added to 50 grams of resin A and further the respective β-amino-α,β-unsaturated ketones were added to it.

The resultant mixture was cured at room temperature of 25° C and the thus obtained results are listed in Table 5.

REFERENCE EXAMPLES 11 – 22

According to the same procedure as that described in Examples 1 – 10, the respective peroxides and accelators as shown in Table 6 were added to 50 grams of resin A which was cured at 25° C.

The thus obtained results are shown in Table 6.

TABLE 3

| Examples | Adding amount of Item A ( ) : wt % | GT (min) | CT (min) | PET (° C) | Color of moldings |
|---|---|---|---|---|---|
| 11 | 0.015 g (0.03 %) | 40.0 | 61.0 | 72 | none |
| 12 | 0.03 g (0.06 %) | 26.0 | 41.0 | 110 | slightly yellow |
| 13 | 0.05 g (0.10 %) | 18.3 | 30.7 | 131 | slightly yellow |
| 14 | 0.10 g (0.20 %) | 13.3 | 22.3 | 144 | light yellow |
| 15 | 0.15 g (0.030%) | 11.0 | 19.3 | 144 | yellow |
| 16 | 0.20 g (0.40 %) | 10.5 | 16.2 | 157 | distinct yellow |
| 17 | 0.40 g (0.80 %) | 7.3 | 14.3 | 156 | distinct yellow |

TABLE 4

| Examples | -amino-. unsaturated ketone | GT (min) | CT (min) | PET (° C) |
|---|---|---|---|---|
| 18 | 4-amino-3-pentene-2-one | 10.5 | 16.2 | 155 |
| 19 | 4-methylamino-3-pentene-2-one | 4.5 | 9.7 | 150 |
| 20 | 4-ethylamino-3-pentene-2-one | 5.5 | 10.2 | 153 |
| 21 | 4-n-propylamino-3-pentene-2-one | 4.2 | 8.6 | 163 |
| 22 | 4-isopropylamino-3-pentene-2-one | 5.1 | 9.9 | 161 |
| 23 | 4-n-butylamino-3-pentene-2-one | 5.0 | 9.5 | 151 |
| 24 | 4-sec-butylamino-3-pentene-2-one | 5.5 | 10.0 | 150 |
| 25 | 4-t-butylamino-3-pentene-2-one | 6.6 | 11.1 | 154 |
| 26 | 4-cyclohexylamino-3-pentene-2-one | 6.4 | 11.5 | 151 |
| 27 | 4-ethanolamino-3-pentene-2-one | 8.4 | 16.6 | 142 |
| 28 | 4-benzylamino-3-pentene-2-one | 6.0 | 11.6 | 150 |
| 29 | 2-amino-2-heptene-4-one | 11.0 | 18.7 | 146 |
| 30 | 1-phenyl-3-amino-2-butene-1-one | 19.0 | 26.7 | 139 |
| 31 | methyl-$\beta$-amino-crotonate | 4.7 | 10.3 | 140 |

TABLE 5

| Example | $\beta$-amino-$\alpha$. $\beta$-unsaturated ketone | GT (min) | CT (min) | PET (min) |
|---|---|---|---|---|
| 32 | 4-amino-3-pentene-2-one | 12.9 | 22.0 | 141 |
| 33 | 4-methylamino-3-pentene-2-one | 5.5 | 13.0 | 143 |
| 34 | 4-ethylamino-3-pentene-2-one | 5.7 | 11.1 | 146 |
| 35 | 4-n-propylamino-3-pentene-2-one | 5.3 | 11.4 | 148 |
| 36 | 4-isopropylamino-3-pentene-2-one | 4.3 | 9.1 | 154 |
| 37 | 4-n-butylamino-3-pentene-2-one | 4.7 | 10.2 | 145 |
| 38 | 4-sec-butylamino-3-pentene-2-one | 4.3 | 9.3 | 148 |
| 39 | 4-t-butylamino-3-pentene-2-one | 3.8 | 7.5 | 150 |
| 40 | 4-cyclohexylamino-3-pentene-2-one | 6.1 | 11.6 | 147 |
| 41 | 4-ethanolamino-3-pentene-2-one | 6.5 | 13.4 | 143 |
| 42 | 4-benzylamino-3-pentene-2-one | 6.0 | 13.2 | 140 |
| 43 | 2-amino-2-heptene-4-one | 15.7 | 27.8 | 130 |
| 44 | 1-phenyl-3-amino-2-butene-1-one | 17.0 | 28.2 | 130 |
| 45 | methyl-$\beta$-amino-crotonatee | 10.3 | 23.0 | 121 |

TABLE 6

| Reference Examples | Peroxides | Accelerator | GT (min) | CT (min) | PET (° C) | Color of molding | Remarks |
|---|---|---|---|---|---|---|---|
| 11 | (2) | none | >600 | — | — | — | X |
| 12 | (2) | 1% cobalt octylate (0.5g) | 3.0 | 13.0 | 43 | light purple | Δ |
| 13 | (2) | acetylacetone (0.5g) | >600 | — | — | — | X |
| 14 | (2) | n-propylamine ($2\times10^{-3}$mol) | — | 300 | 30 | light yellow | Δ |
| 15 | (3) | none | >600 | — | — | — | X |
| 16 | (3) | 1% cobalt octylate (0.5g) | 57.7 | 84.3 | 48 | yellow | Δ |
| 17 | (3) | acetylacetone (0.5g) | >600 | — | — | — | X |
| 18 | (3) | acetylacetone (0.5g) | — | 420 | — | light yellow | Δ |
| 19 | (3) (0.5g) | n-propylamine ($2\times10^{-3}$mol) | 34.0 | 52.3 | 116 | pink | |
| 20 | (4) | none | >600 | — | — | — | X |
| 21 | (6) | none | >600 | — | — | — | X |
| 22 | (7) | none | >600 | — | — | — | X |

Note: Numeral in parenthesis shows additional amount of accelerator

It is apparent from Table 6, that hydrogen peroxide alone, or together with a cobalt accelerator, does not cure the unsaturated polyester resin completely and PET thereof is low and then it has been considered very difficult to use hydrogen peroxide of low price for curing unsaturated polyester resin. (See Reference Examples 11 – 14)

It is clear from Table 3, according to the present invention, suprisingly, that hydrogen peroxide which is obtainable at low price and is not dangerous for handling, can be employed as a curing cataylst to cure unsaturated polyester resin effectively with a small amount of $\beta$-amino-$\alpha$,$\beta$-unsaturated ketone.

Accordingly, the curing cost of the present invention has been reduced from ½ to ⅓, compared to that of the conventional curing method using an expensive organic peroxide.

The CT and PET of the conventional curing method at room temperature in which both the amount added of popular methylethylketone peroxide and 1 wt% of cobalt salt are equivalent to 1wt% of resin, are 52.6 min and 116° C respectively. See Reference Example 19).

On the contrary, it will be appreciated that the present invention using the $\beta$-amino-$\alpha$,$\beta$-unsaturated ketone can effect curing in a shorter time than each reference example and the PET of the present invention is higher and then curing of the resin proceeded completely.

TABLE 7

| Examples | $\beta$-amino-$\alpha$. $\beta$-unsaturated ketone | GT (min) | CT (min) | PET (° C) |
|---|---|---|---|---|
| 46 | 4-methylamino-3-pentene-2-one | 12.3 | 30.3 | 101 |

TABLE 7-continued

| Examples | β-amino-α. β-unsaturated ketone | GT (min) | CT (min) | PET (° C) |
|---|---|---|---|---|
| 47 | 4-ethylamino-3-pentene-2-one | 27.7 | 43.3 | 108 |
| 48 | 4-n-propylamino-3-pentene-2-one | 21.8 | 36.0 | 110 |
| 49 | 4-isopropylamino-3-pentene-2-one | 21.0 | 33.9 | 118 |
| 50 | 4-n-butylamino-3-pentene-2-one | 26.3 | 42.7 | 106 |
| 51 | 4-sec-butylamino-3-pentene-2-one | 23.7 | 39.0 | 111 |
| 52 | 4-cyclohexylamino-3-pentene-2-one | 27.6 | 44.7 | 103 |
| 53 | 4-benzylamino-3-pentene-2-one | 27.3 | 47.0 | 101 |

TABLE 8

| Reference Examples | Additional amount Peroxide (methylethyl-ketone peroxide) | Accelerator (1% cobaltic octylate) | GT (min) | CT (min) | PET (° C) | Apparatus of moldings | Remarks |
|---|---|---|---|---|---|---|---|
| 23 | 0.3 g | 0.5 g | >300 | | | | X |
| 24 | 0.5 g | 0.5 g | 225.4 | 257.0 | 18 | purple | Δ |

EXAMPLE 46 – 53

According to the same procedure as that described in Example 1–10, 50 grams of resin A, into which the respective β-amino-α,β-unsaturated ketones shown in Table 7 was added, was cured at a low temperature of 10° C, using 60wt% hydrogen peroxide solution.

The thus obtained results are listed in Table 7.

REFERENCE EXAMPLES 23 – 24

According to the same procedure as that described in Examples 1–10, the respective peroxide and accelerator as shown in Table 8 was added to 50 grams of resin A.

The resin A was cured at 10° C of low temperature and the thus obtained results are listed in Table 8.

It is apparent from Table 7 and Table 8, according to a conventional process using the common amount of ketone peroxide-cobalt salt, in curing at 10° C of low temperature, it takes 3– 5 hours to gel. and PET is very low with the result that curing is incomplete.

On the contrary, it will be appreciated that the present invention is superior to conventional processes in curing at low temperature, too and especially, when β-monoalkylamino-α,β-unsaturated ketone derived from acetylacetone and monoalkylamine is used, curing is conducted as rapidly as one hour and PET is over 100° C, whereby complete curing can be obtained.

From these facts, it will be understood that the curing method of the present invention can be a satisfactory method for curing in a cold atmosphere.

EXAMPLE 54 – 59, Reference Examples 25 – 30

According to the same procedure as that described in Example 1 – 10, to 50 grams of resin A, the respective peroxide as shown in Table 9 was added and further 4-amino-3-pentene-2-one was added, whereby curing was conducted at 80° C and the thus obtained results are listed in Table 9.

The 50 grams of resin A, the respective peroxides as shown in the Reference Examples column in Table 9, was added, whereby curing was conducted at 80° C without adding of β-amino-α,β-unsaturated ketone.

Also, the thus obtained results are listed in Table 9. It is clear from Table 9 that in curing the unsaturated polyester resin at elevated temperature, comparing curing with β-amino-α,β-unsaturated ketone (Examples 54 – 59) to that without adding β-amino-α,β-unsaturated ketone, (Reference Examples 25 – 30) the former cured the resin completely within a shorter time than the latter did.

Especially, the present invention is effective for curing at elevated temperatures using peroxides having no hydroperoxy group which are not effective in combination of β-amino-α,β-unsaturated ketone in curing at room temperature. (Example 57 – 58)

Accordingly, it will be appreciated that the present invention makes all kinds of peroxides effective for curing, at elevated temperatures.

TABLE 9

| Examples or Reference Examples | | Peroxide | GT (min) | CT (min) | PET (° C) |
|---|---|---|---|---|---|
| Example | 54 | (1) 90% hydrogen peroxide solution | 3.5 | 4.3 | 196 |
| " | 54 | (2) 60% hydrogen peroxide solution | 3.5 | 4.3 | 194 |
| " | 56 | (3) methylethylketone peroxide diluted | 3.7 | 4.7 | 194 |
| " | 57 | (4) diemyl peroxide | 19.5 | 34.0 | 132 |
| " | 58 | (5) benzoyl peroxide | 8.4 | 99.44 | 197 |
| " | 59 | (6) cumenehydro peroxide | 6.4 | 7.6 | 198 |
| Reference Example | 25 | (1) 90% hydrogen peroxide solution | 22.8 | 32.7 | 108 |
| " | 26 | (2) 60% hydrogen peroxide solution | 22.9 | 33.0 | 99 |
| " | 27 | (3) methylethylketone peroxide diluted | 10.8 | 13.6 | 182 |
| " | 28 | (4) diemyl peroxide | 300 | — | — |
| " | 29 | (5) benzoyl peroxide | 11.3 | 12.3 | 206 |
| " | 30 | (6) cumenehydro peroxide | 18.6 | 29.3 | 102 |

EXAMPLES 60 – 62

REFERENCE EXAMPLE 31

According to the same procedure as that described in Example 1 to Example 10, to 50 grams of resin A, benzoyl peroxide and 0.16 gram of 25% dimethyl aniline were added and further the respective β-amino-α,β-unsaturated ketone was added, whereby curing were conducted at 25° C.

The thus obtained results are listed in Table 10. It is clear from Table 10 that diacylperoxides, in combination of β-amino-α,β-unsaturated ketone do not cure the resin without the aid of tertiary amine such as dimethyl aniline but in combination of a tertiary amine shorten the curing time with aid of β-amino-α,β-unsaturated ketone.

TABLE 10

| Example or Reference Example | | β-aminoα. β-unsaturated ketone | GT (min) | CT (min) | PET (° C) |
| --- | --- | --- | --- | --- | --- |
| Example | 60 | 4-amino-3-pentene-2-one | 8.0 | 12.5 | 140 |
| " | 61 | 2-amino-2-heptene-4-one | 10.0 | 15.3 | 140 |
| " | 62 | methyl-β-amino-crotonate | 8.7 | 13.7 | 141 |
| Reference Example | 31 | none | 19.0 | 24.7 | 137 |

What is claimed is:

1. In a process for hardening unsaturated polyester resins which comprises contacting a mixture of an unsaturated polyester resin and a vinyl monomer copolymerizable therewith, with a hardening agent, the improvement which comprises; said hardening agent is a mixture of a peroxide containing a hydroperoxy group and a β-amino-α,β-unsaturated ketone having the formula

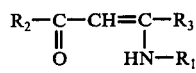

wherein
R₁ is hydrogen, alkyl having one to 6 carbon atoms, cyanoalkyl or hydroxyalkyl having one to 6 carbon atoms, cycloalkyl having 3 to 12 carbon atoms or aralkyl,
R₂ and R₃ each are hydrogen, alkyl having one to 6 carbon atoms, cycloalkyl having 3 to 12 carbon atoms, aryl, alkoxy or amino.

2. A process according to claim 1 in which said unsaturated polyester is obtained by reaction between an unsaturated dicarboxylic acid or polyester-forming derivative thereof, with a saturated polyol or polyester-forming derivative thereof.

3. A process according to claim 1 in which said hardening agent contains from 0.01 to 10.0 weight percent of said peroxide, based on the weight of said unsaturated polyester resin, and from 0.005 to 10.0 weight percent of said ketone, based on the weight of said unsaturated polyester resin.

4. A process according to claim 1 in which said hardening agent contains from 0.05 to 5.0 weight percent of said peroxide, based on the weight of said unsaturated polyester resin, and from 0.01 to 5.0 weight percent of said ketone, based on the weight of said unsaturated polyester resin.

5. A process according to claim 3 in which the hardening temperature is from −10° to +150° C.

6. A process according to claim 4, wherein said β-amino-α,β-unsaturated ketone is one or more compounds selected from the group consisting of 4-amino-3-pentene-2-one, 4-methylamino-3-pentene-2-one, 4-isopropylamino-3-pentene-2-one, 4-t-butylamino-3-pentene-2-one, 4-sec-butylamino-3-pentene-2-one, 4-n-butylamino-3-pentene-2-one, 4-cyclohexylamino-3-pentene-2-one, 4-benzylamino-3-pentene-2-one, 4-ethanolamino-3-pentene-2-one, methyl-β-aminocrotonate, ethyl-β-aminocrotonate, methyl-β-t-butylaminocrotonate, and 1-phenyl-3-amino-2-butene-1-one.

7. A process according to claim 6, wherein said peroxide is hydrogen peroxide.

8. A process according to claim 6, wherein said peroxide is one or more ketone peroxide compounds selected from the group consisting of methylethylketone peroxide, methylisobutylketone peroxide, cyclohexanone peroxide, methylcyclohexanone peroxide, 3,3,5-trimethylcyclohexanone peroxide, acetylacetone peroxide, 4-methoxy-4-methylpentane-2-one peroxide and diacetone alcohol peroxide.

9. A process according to claim 6, wherein said peroxide is a hydroperoxide selected from the group consisting of cumene hydroperoxide, tert-butyl hydroperoxide, 2,5-dimethylhexyl-2,5-dihydroperoxide and p-menthane hydroperoxide.

10. A process according to claim 6, wherein said peroxide is an aldehyde peroxide.

11. A process according to claim 4 in which the hardening temperature is from zero to plus 40° C.

12. A process according to claim 1 in which said vinyl monomer is styrene.

* * * * *